United States Patent
Marlin et al.

(10) Patent No.: US 11,135,994 B2
(45) Date of Patent: Oct. 5, 2021

(54) PYROTECHNICAL GAS GENERATOR FOR AN AIRBAG

(71) Applicant: ARIANEGROUP SAS, Paris (FR)

(72) Inventors: Frédéric Marlin, Saint Medard en Jalles (FR); Clément Benillan, Le Taillan Medoc (FR)

(73) Assignee: ARIANEGROUP SAS, Paris (FR)

( * ) Notice: Subject to any disclaimer, the term of this patent is extended or adjusted under 35 U.S.C. 154(b) by 76 days.

(21) Appl. No.: 16/621,913

(22) PCT Filed: Jun. 13, 2018

(86) PCT No.: PCT/EP2018/065609
§ 371 (c)(1),
(2) Date: Dec. 12, 2019

(87) PCT Pub. No.: WO2018/229101
PCT Pub. Date: Dec. 20, 2018

(65) Prior Publication Data
US 2020/0122680 A1    Apr. 23, 2020

(30) Foreign Application Priority Data
Jun. 13, 2017  (EP) .................................. 17305719

(51) Int. Cl.
*B60R 21/264*   (2006.01)
*B60R 21/26*    (2011.01)

(52) U.S. Cl.
CPC .. *B60R 21/264* (2013.01); *B60R 2021/26029* (2013.01); *B60R 2021/2642* (2013.01)

(58) Field of Classification Search
CPC . B60R 21/261; B60R 21/264; B60R 21/2644; B60R 2021/26029;
(Continued)

(56) References Cited

U.S. PATENT DOCUMENTS 3,602,526 A * 8/1971 Brawn ................. B60R 21/261
                                                  280/740
4,178,017 A * 12/1979 Ishi ........................ B60R 21/26
                                                  280/740
5,584,506 A * 12/1996 Van Wynsberghe ........................
                                                  B60R 21/261
                                                  280/736

(Continued)

FOREIGN PATENT DOCUMENTS

DE      195 05 580 A1    8/1996
DE      197 16 652 A1   10/1998
WO   WO 2015/042126 A1   3/2015

OTHER PUBLICATIONS

International Search Report as issued in International Patent Application No. PCT/EP2018/065609, dated Sep. 3, 2018.

*Primary Examiner* — Laura Freedman

(74) *Attorney, Agent, or Firm* — Pillsbury Winthrop Shaw Pittman LLP

(57) ABSTRACT

A pyrotechnical gas generator includes at least one pyrotechnical charge, at least one ignitor, and a cylindrical casing enclosing the at least one charge and the at least one ignitor, the cylindrical casing having an axial direction and a radial direction and including an annular wall extending along the axial direction of the casing, and gas ejection holes arranged on the annular wall. Each gas ejection hole extends in a output plane forming a non-zero angle with a tangential plane which is tangent to the annular wall at the gas ejection hole.

10 Claims, 2 Drawing Sheets

(58) Field of Classification Search
CPC .. B60R 2021/26076; B60R 2021/2642; B60R 2021/2648
See application file for complete search history.

(56) References Cited

U.S. PATENT DOCUMENTS

| | | | | |
|---|---|---|---|---|
| 6,095,558 A * | 8/2000 | Bayer | ................. | B60R 21/2644 280/741 |
| 6,149,192 A * | 11/2000 | Swann | ................... | B60R 21/26 280/740 |
| 6,183,007 B1 * | 2/2001 | Steffens, Jr. | ............ | B60R 21/26 280/736 |
| 6,871,872 B2 * | 3/2005 | Thomas | ................ | B60R 21/261 280/736 |
| 7,866,692 B2 * | 1/2011 | Windhausen | ....... | B60R 21/2644 280/736 |
| 7,874,575 B2 * | 1/2011 | Fukuyama | ............ | B60R 21/261 280/728.2 |
| 7,938,443 B1 * | 5/2011 | Smith | ................... | B60R 21/261 280/736 |
| 8,142,534 B2 * | 3/2012 | Whang | ............... | B60R 21/2644 55/385.3 |
| 8,236,112 B2 * | 8/2012 | Yamazaki | ........... | B60R 21/2644 149/2 |
| 8,297,653 B2 * | 10/2012 | Smith | ................. | B60R 21/2644 280/741 |
| 8,777,258 B2 * | 7/2014 | Kobayashi | .......... | B60R 21/2644 280/736 |
| 10,676,062 B2 * | 6/2020 | Adamczyk | ........... | B01D 46/527 |
| 2004/0061319 A1 * | 4/2004 | Saso | ................... | B60R 21/2644 280/741 |
| 2004/0155444 A1 * | 8/2004 | Matsuda | ............. | B60R 21/2644 280/741 |
| 2015/0128799 A1 | 5/2015 | Laubacher et al. | | |
| 2016/0229372 A1 * | 8/2016 | Spencer | ................ | B60R 21/264 |

* cited by examiner

PYROTECHNICAL GAS GENERATOR FOR AN AIRBAG

CROSS-REFERENCE TO RELATED APPLICATIONS

This application is the U.S. National Stage of PCT/EP2018/065609, filed Jun. 13, 2018, which in turn claims priority to European patent application number 17305719.1 filed Jun. 13, 2017. The content of these applications are incorporated herein by reference in their entireties.

BACKGROUND OF THE INVENTION

The invention relates to an inflator, and in particular to a pyrotechnical gas generator designed to inflate the bag of an airbag. The present invention further relates to an airbag device having such an inflator.

An inflator for use in an airbag device for a passenger seat generally comprises a cylindrical casing having holes for discharging gas disposed on the peripheral surface thereof, propellant filled in the casing, booster for causing gas evolution of the propellant, an electrical igniter for igniting the booster, and auto ignition material having a lower firing temperature than the firing temperature of the booster. The casing is generally made of steel or stainless steel.

The current nozzles used in the inflators to provide gas jets are generally round holes made in the steel casing, sealed by a film, and which usually have diameters between 2 mm and 4 mm for frontal disc shape inflators. The number of holes is usually between 4 to 16. As gas is generated by the propellant, the film is broken by the gas pressure. The cylindrical inflator of this type is sometimes used for an airbag device for a driver seat.

In the field of devices for automotive applications, constructors are always looking after new solutions which can bring weight and cost decrease. In an inflator, the filtering device represents an non-negligible part of its total weight.

The filtering device used in a pyrotechnical gas generator has currently three main functions which are:
  decreasing the gas temperature so that the exhaust gas does not damage the bag,
  avoiding having particles emitted by the inflator which can make pin holes in the bag, and,
  keeping slag and particles inside the inflator to meet solid effluents expected level.

Some low burning temperature compositions are used in pyrotechnical gas generators to reduce their total weight as they can exhibit an exhaust gas temperature and an aggressiveness of the jets allowing a significant decrease in the size, and thus the weight, or even a cancellation of the filtering device in the inflator. Indeed, the low burning temperature compositions allows decreasing the burning temperatures and improve the slagging effect with less particles.

However, these compositions are not sufficient on their own to meet all the requirements allowing the removal of the filtering device in a pyrotechnical gas generator designed to be used in an airbag.

OBJECT AND SUMMARY OF THE INVENTION

The invention aims to solve the aforementioned problems, by providing a pyrotechnical gas generator for an airbag with a reduced weight, and furthermore, providing a light pyrotechnical gas generator with a maximized output gas flow and a minimized jet's aggressiveness.

This goal is reached thanks to a pyrotechnical gas generator comprising at least one pyrotechnical charge, at least one ignitor, and a cylindrical casing enclosing said at least one charge and said at least one ignitor, said cylindrical casing having an axial direction and a radial direction and comprising an annular wall extending along said axial direction, and gas ejection holes arranged on said annular wall for letting the inside of the casing to communicate with the outside of the casing.

According to a general feature of this pyrotechnical gas generator, each gas ejection hole extends in a output plane forming a non-zero angle with a tangential plane which is tangent to said annular wall at said gas ejection hole.

Having an output section forming a non-zero angle with a tangential plane provides the gas jet with a tangential component, thus reducing the aggressiveness of the gas jet on the parts of an object cooperating with the gas generator close to the gas generator.

The energy delivered in the radial direction is reduced and therefore the energy is smoothen.

In a preferred embodiment of the pyrotechnical gas generator, the output plane forms an angle with the tangential plane which is strictly superior to 90°.

In a first aspect of the pyrotechnical gas generator, each gas ejection hole comprises a notch extending along said axial direction and the casing is stamped on one same side of each notch.

Realising the gas ejection holes with a notch and a stamping on one side simplifies to a minimum the production of the holes.

In a second aspect of the pyrotechnical gas generator, the casing comprises more than sixteen gas ejection holes arranged homogeneously around said annular wall.

The great number of gas ejection holes, i.e. nozzles, allows to smoothen the energy homogeneously on a higher area and increase the flow of gas delivered by the gas generator while maintaining a low radial aggression of the gas jets.

In a third aspect of the pyrotechnical gas generator, the notch of each gas ejection hole has a length less than or equal to 1 mm.

The small size of the notch, first, allows reducing the energy delivered by each hole, and, second, enables the gas ejection hole to act as a filter for big particles which could make pin holes in the bag of an airbag cooperating such a gas generator.

The casing can therefore integrate the function of a filtering device, thus reducing the total weight of the pyrotechnical gas generator as a separate filtering device is no longer needed.

In a fourth aspect of the pyrotechnical gas generator, the gas ejection holes are arranged on several rings running along the annular wall.

Arranging the gas ejection holes on several rings allows increasing the number of holes and thus increasing the flow of gas delivered.

In a fifth aspect of the pyrotechnical gas generator, the casing is made of a thin sheet of metal and each gas ejection hole comprises some least resistance lines along which the hole will preferably deform or tear itself to enlarge the opening in case of a too high pressure difference between inside and outside the casing.

In a sixth aspect of the pyrotechnical gas generator, the casing's resistance between two adjacent gas ejection holes along the axial direction is less than a threshold so that the casing can be slightly torn up in case of overpressure to increase the gas ejection holes area and decrease the pressure, thus limiting the risks of explosion of the casing.

In another object of the invention, it is proposed an airbag assembly comprising a bag and a pyrotechnical gas generator as defined here above and acting as an inflator, said bag being sealed around said pyrotechnical gas generator in an air tight manner.

BRIEF DESCRIPTION OF THE DRAWINGS

The invention will be better understood by reading here after, as examples and in a non-limitative way, in reference to the enclosed drawings on which.

DETAILED DESCRIPTION OF THE EMBODIMENTS

Figure 1:
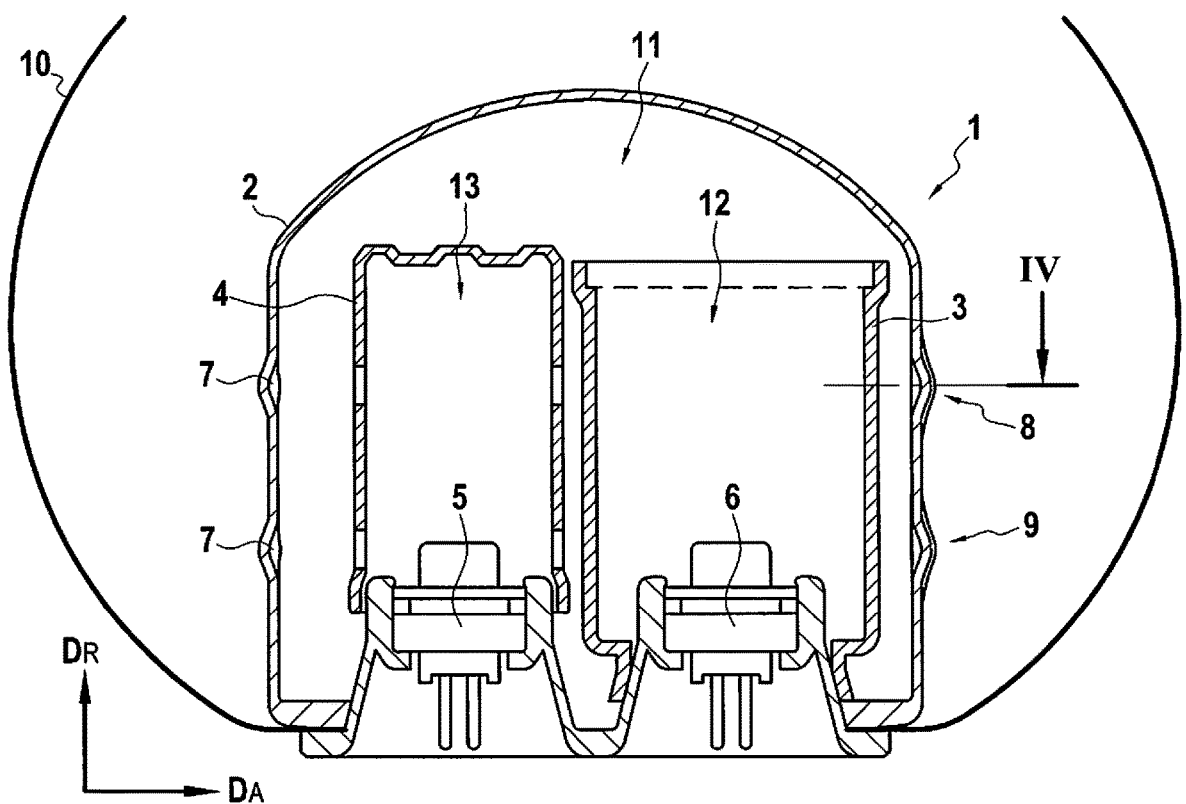
FIG. 1 shows schematically a view in section of an airbag assembly comprising a bag and a pyrotechnical gas generator according to an embodiment of the invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1 is schematically presented a view in section of an airbag assembly comprising a bag 10 and a pyrotechnical gas generator 1 according to an embodiment of the invention.

The bag 10 is attached to the pyrotechnical gas generator 1 in an airtight manner.

The pyrotechnical gas generator 1, or inflator, has a cylindrical casing 2 made of metal such as steel or stainless steel. The inside of the casing 2 defines a first chamber 11.

The pyrotechnical gas generator 1 further comprises a first cylindrical partition 3 and a second cylindrical partition 4. The inside of the first cylindrical partition 3 defines a second chamber 12 and the inside of the second cylindrical partition 4 defines an ignition chamber 13. The first chamber 11 is thus defined by the space left inside the casing 2 once the two cylindrical partitions 3 and 4 have been inserted in the casing 2. The second partition wall 4 defining the ignition chamber 13 is perforated in order to communicate with the first chamber 11.

Filled in the first and second chambers 11 and 12 are gas generant for generating gases, respectively, and filled in the ignition chamber 13 is an ignition load. The second chamber 12 and the ignition chamber 13 are both provided with ignitors 5, 6. The electrical ignitors 5 and 6 have a wire generating heat by electricity and explosive. When the wire is turned on an electric current, the ignitor is fired and thereby the generant or the ignition load is ignited so that the generant initiates the gas evolution.

Figure 2:
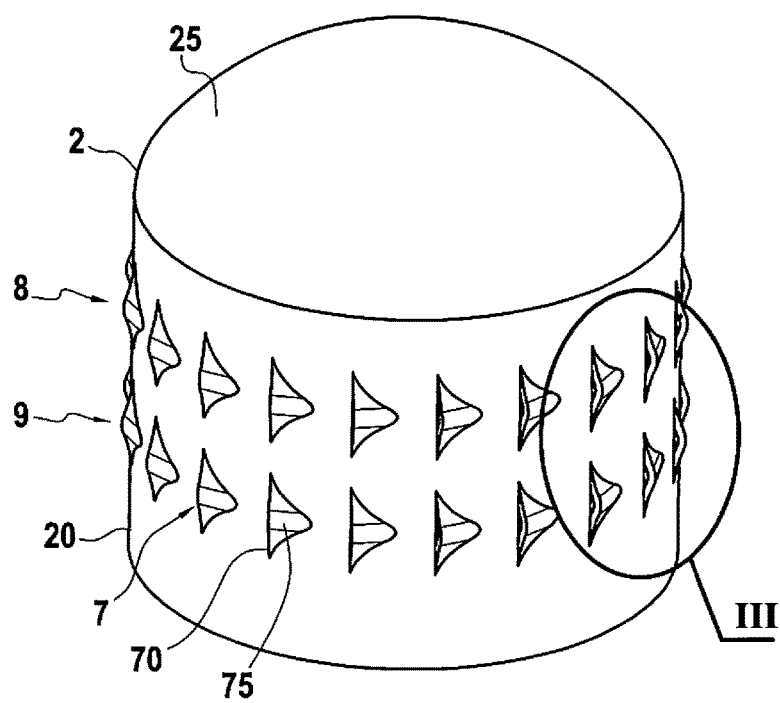
FIG. 2 shows a view in perspective of the casing of the pyrotechnical gas generator of FIG. 1.

As illustrated on FIG. 2 which shows a view in perspective of the casing 2 of the pyrotechnical gas generator 1 of FIG. 1, the casing 2 is cylindrical with an annular surface 20 extending along the axial direction $D_A$ and defining a tube. The annular surface 20 extends along the axial direction $D_A$ from a top wall 25 extending in the radial direction $D_R$.

The annular surface 20 comprises a plurality of gas ejection openings, or nozzles, 7 for allowing gas to spout from the first chamber 11 of the casing 2 and inflate the bag 10.

Figure 3:
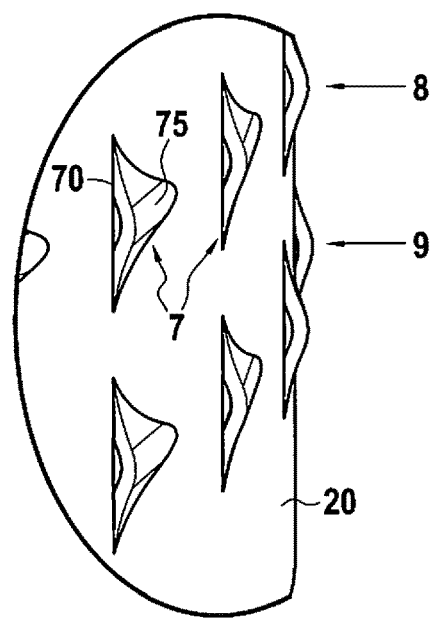
FIG. 3 shows a zoomed in view of a portion III of the gas ejection hole of the casing of FIG. 2.

As illustrated on FIG. 2 and on FIG. 3 which is a zoom of part III of FIG. 2, each nozzle 7 is made by, first, cutting a notch 70 into the annular surface, the notch 70 extending along said axial direction $D_A$, and, second, stamping the casing 2 on one side of the notch 70, the stamping 75 being made from the inside of the casing 2 to deform the casing 2 towards the outside, i.e. away from the axial centre of the casing 2. The stamping 75 is made on the same side of each notch 70 for every nozzle 7.

Figure 4:
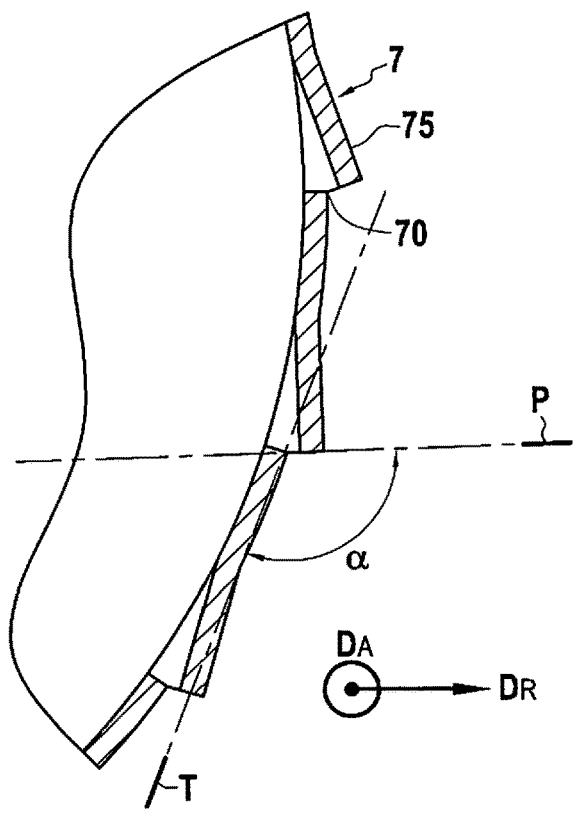
FIG. 4 represents a section view according to a plane IV of FIG. 3.

As illustrated on FIG. 4 which represents a section view according to a plane IV comprising the radial direction $D_R$ and perpendicular to the axial direction $D_A$ of the casing 2, the notch 70 and the stamping 75 cooperate to define an output section of the nozzle 7 extending in a first plane P comprising the axial direction $D_A$, the first plane P forming a non-zero angle α with a second plane T which is tangent to the annular wall 20 at the notch 70 and comprises the axial direction $D_A$. In other words, the first plane P and the second plane T both comprise the axial direction $D_A$ but are distinct from each other, thus forming an angle α which cannot have a value equal to zero or 180°. The non-zero angle α formed by the first and second planes P and T ensures that the gaz jet ejected from the nozzle is not purely radial, i.e. is not directed only along the radial direction $D_R$, but comprises a tangential component, i.e. comprises a radial component and a tangential component, thus reducing the aggressiveness of the jet on the bag.

In a preferred embodiment, the angle α formed by the first and the second planes P and T is strictly superior to 90°, and in particular slightly superior to 90°, for example between 92° and 100°.

In the embodiment illustrated on FIGS. 2 and 3, the casing 2 comprises forty-four nozzles 7 arranged on two rings 8 and 9 running around the annular wall 20 at two different positions along the axial direction $D_A$. Each notch 70 of each nozzle 7 has a length of 0.5 mm.

The nozzles 7 thus integrate the gas ejection function together with the filtering function for big particles which could make pin holes in the bag of an airbag cooperating such a gas generator 1.

In this embodiment, the casing's resistance between two adjacent nozzles 7 along the axial direction $D_A$ is less than a threshold so that the casing can be slightly torn up in case of overpressure to increase the nozzles area and decrease the pressure, thus limiting the risks of explosion of the casing 2.

The casing 2 is an external casing configured to be directly in contact with the external environment of the pyrotechnical gas generator 1, i.e. the most external casing of the pyrotechnical gas generator 1. In the airbag assembly of FIG. 1, the casing 2 is thus the most external casing of the gas generator 1, and is regarding the bag 10 of the airbag assembly, no other element, such as another casing or a filter for example, being positioned between the casing 2 and the bag 10.

The invention provides thus a pyrotechnical gas generator for airbag, and an airbag, with a reduced weight and a maximized output gas flow and a minimized jet's aggressiveness.

The invention claimed is:

1. A pyrotechnical gas generator comprising at least one pyrotechnical charge, at least one ignitor, and a cylindrical casing enclosing said at least one charge and said at least one ignitor, said cylindrical casing having an axial direction and a radial direction and comprising an annular wall extending along said axial direction of said casing, and gas ejection holes arranged on said annular wall,
    wherein said at least one pyrotechnical charge comprises a gas generant and an ignition load,
    wherein said at least one ignitor comprise a first ignitor and a second ignitor,
    wherein said cylindrical casing defines a first chamber comprising a first cylindrical partition defining a second chamber enclosing the gas generant and the first ignitor, the first chamber further comprising a second cylindrical partition defining an ignition chamber enclosing the ignition load and the second ignitor, and each gas ejection hole extends in a output plane forming a non-zero angle with a tangential plane which is tangent to said annular wall at said gas ejection hole.

2. The pyrotechnical gas generator according to claim 1, wherein the output plane forms an angle with the tangential plane which is strictly superior to 90°.

3. The pyrotechnical gas generator according to claim 1, wherein each gas ejection hole comprises a notch extending along said axial direction and the casing is stamped on one same side of each notch.

4. The pyrotechnical gas generator according to claim 3, wherein the notch of each gas ejection hole has a length less than or equal to 1 mm.

5. The pyrotechnical gas generator according to claim 3, wherein a resistance of the casing between two adjacent gas ejection holes along the axial direction is less than a threshold.

6. The pyrotechnical gas generator according to claim 1, wherein the casing comprises more than sixteen gas ejection holes arranged homogeneously around said annular wall.

7. The pyrotechnical gas generator according to claim 1, wherein the gas ejection holes are arranged on several rings running along the annular wall.

8. The pyrotechnical gas generator according to claim 1, wherein the casing is made of a thin sheet of metal and each gas ejection hole comprises some least resistance lines along which the hole will deform or tear itself to enlarge an opening thereof in case of a high pressure difference between inside and outside the casing.

9. The pyrotechnical gas generator according to claim 1, wherein said cylindrical casing is an external casing configured to be directly in contact with an external environment of the pyrotechnical gas generator.

10. An airbag assembly comprising a bag and a pyrotechnical gas generator according to claim 1 acting as an inflator, said bag being sealed around said pyrotechnical gas generator in an air tight manner.

* * * * *